United States Patent
Nautiyal et al.

(10) Patent No.: US 9,264,864 B1
(45) Date of Patent: Feb. 16, 2016

(54) MESSAGE DELIVERY RECEIPT TRANSMISSION IN A WIRELESS COMMUNICATION SYSTEM

(71) Applicant: Sprint Communications Company L.P., Overland Park, KS (US)

(72) Inventors: Rajesh Kumar Nautiyal, Olathe, KS (US); Badri Prasad Subramanyan, Overland Park, KS (US); Rajil Malhotra, Olathe, KS (US); Ashish Bhan, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/975,513

(22) Filed: Aug. 26, 2013

(51) Int. Cl.
*H04W 4/00* (2009.01)
*H04W 4/14* (2009.01)
*H04L 12/26* (2006.01)

(52) U.S. Cl.
CPC ...................................... *H04W 4/14* (2013.01)

(58) Field of Classification Search
CPC ....................................................... H04W 4/12
USPC ........................................................ 455/466
See application file for complete search history.

(56) References Cited

U.S. PATENT DOCUMENTS

| | | | |
|---|---|---|---|
| 2003/0003930 A1* | 1/2003 | Allison | H04W 88/184 455/466 |
| 2005/0202836 A1* | 9/2005 | Schaedler | H04W 4/14 455/466 |
| 2011/0230212 A1* | 9/2011 | Cai et al. | 455/466 |
| 2012/0165048 A1* | 6/2012 | Zhu | 455/466 |
| 2014/0179360 A1* | 6/2014 | Jackson et al. | 455/466 |

* cited by examiner

Primary Examiner — Huy C Ho

(57) ABSTRACT

A data message service system comprises a communication transceiver and a processing system. The communication transceiver is configured to receive a data message from a first wireless communication device for delivery to a second wireless communication device, wherein the data message indicates a delivery receipt request. The processing system is configured to, responsive to the delivery receipt request, store an identifier of a service node serving the first wireless communication device. The processing system is further configured to direct the communication transceiver to transfer the data message for delivery to the second wireless communication device, and transfer a delivery receipt for delivery to the first wireless communication device using the identifier of the service node serving the first wireless communication device.

20 Claims, 5 Drawing Sheets

MESSAGE DELIVERY RECEIPT TRANSMISSION IN A WIRELESS COMMUNICATION SYSTEM

TECHNICAL BACKGROUND

Individuals and businesses are becoming increasingly reliant on communication networks to send and receive information. For example, individuals may utilize communication networks for voice communications, research, and entertainment, while organizations typically require the use of high speed data networks such as the Internet for conducting critical business transactions.

Several types of communication are commonly utilized over a network. For example, users may communicate via traditional voice calls, email, short message service (SMS) text messages, multimedia message service (MMS) messages, instant messaging (IM), push-to-talk (PTT), and various other communication techniques. These different messaging types often include a feature which allows the sending communication device to request a notification when the message is delivered to its intended recipient. For example, a wireless communication device may send an SMS text message to another wireless communication device and request a delivery receipt for confirmation of delivery of the SMS message. Once the original SMS message is delivered to the target wireless communication device, a new SMS message is typically prepared for the delivery receipt requested by the sending wireless communication device. To transmit the delivery receipt to the sending device that requested it, a home location register (HLR) query is typically performed to obtain the location of the MSC serving the sending device. The delivery receipt message is then transmitted to the sending device via its serving MSC.

Overview

A method to facilitate message delivery receipt in a communication system is disclosed. The method comprises receiving a data message from a first wireless communication device for delivery to a second wireless communication device, wherein the data message indicates a delivery receipt request. The method further comprises, responsive to the delivery receipt request, storing an identifier of a service node serving the first wireless communication device. The method further comprises transferring the data message for delivery to the second wireless communication device, and transferring a delivery receipt for delivery to the first wireless communication device using the identifier of the service node serving the first wireless communication device.

A data message service system comprises a communication transceiver and a processing system. The communication transceiver is configured to receive a data message from a first wireless communication device for delivery to a second wireless communication device, wherein the data message indicates a delivery receipt request. The processing system is configured to, responsive to the delivery receipt request, store an identifier of a service node serving the first wireless communication device. The processing system is further configured to direct the communication transceiver to transfer the data message for delivery to the second wireless communication device, and transfer a delivery receipt for delivery to the first wireless communication device using the identifier of the service node serving the first wireless communication device.

A computer apparatus to facilitate message delivery receipt in a communication system comprises software instructions and at least one non-transitory computer-readable storage medium storing the software instructions. The software instructions are configured, when executed by a data message service system, to direct the data message service system to receive a data message from a first wireless communication device for delivery to a second wireless communication device, wherein the data message indicates a delivery receipt request. The software instructions are further configured to direct the data message service system to, responsive to the delivery receipt request, store an identifier of a service node serving the first wireless communication device. The software instructions are further configured to direct the data message service system to transfer the data message for delivery to the second wireless communication device, and transfer a delivery receipt for delivery to the first wireless communication device using the identifier of the service node serving the first wireless communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
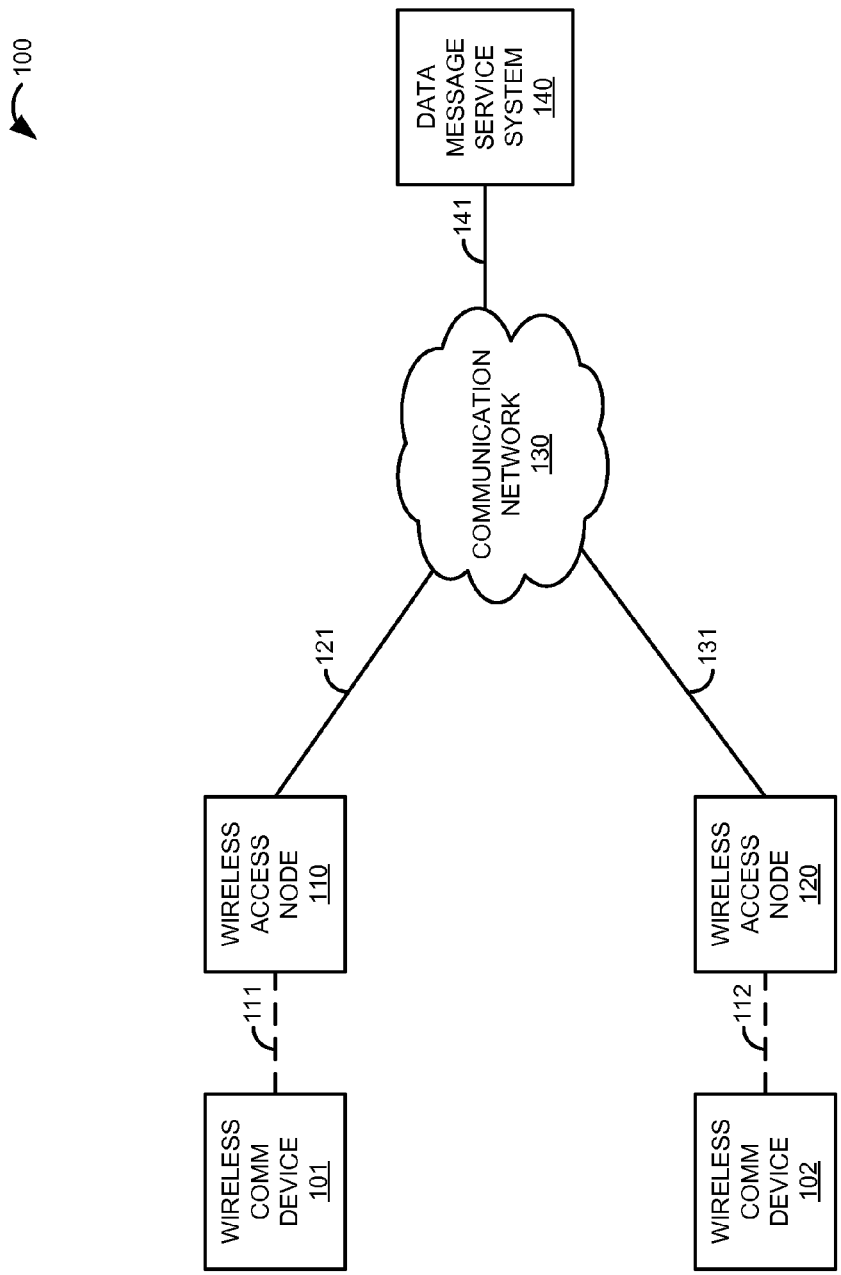
FIG. 1 is a block diagram that illustrates a communication system.

FIG. 1 is a block diagram that illustrates communication system 100. Communication system 100 includes wireless communication devices 101 and 102, wireless access nodes 110 and 120, communication network 130, and data message service system 140. Wireless communication device 101 and wireless access node 110 are in communication over wireless communication link 111. Likewise, wireless communication device 102 and wireless access node 120 are in communication over wireless communication link 112. Wireless access node 110 and communication network 130 communicate over communication link 121, while wireless access node 120 and communication network 130 communicate over communication link 131. Communication network 130 and data message service system 140 are in communication over communication link 141.

Figure 2:
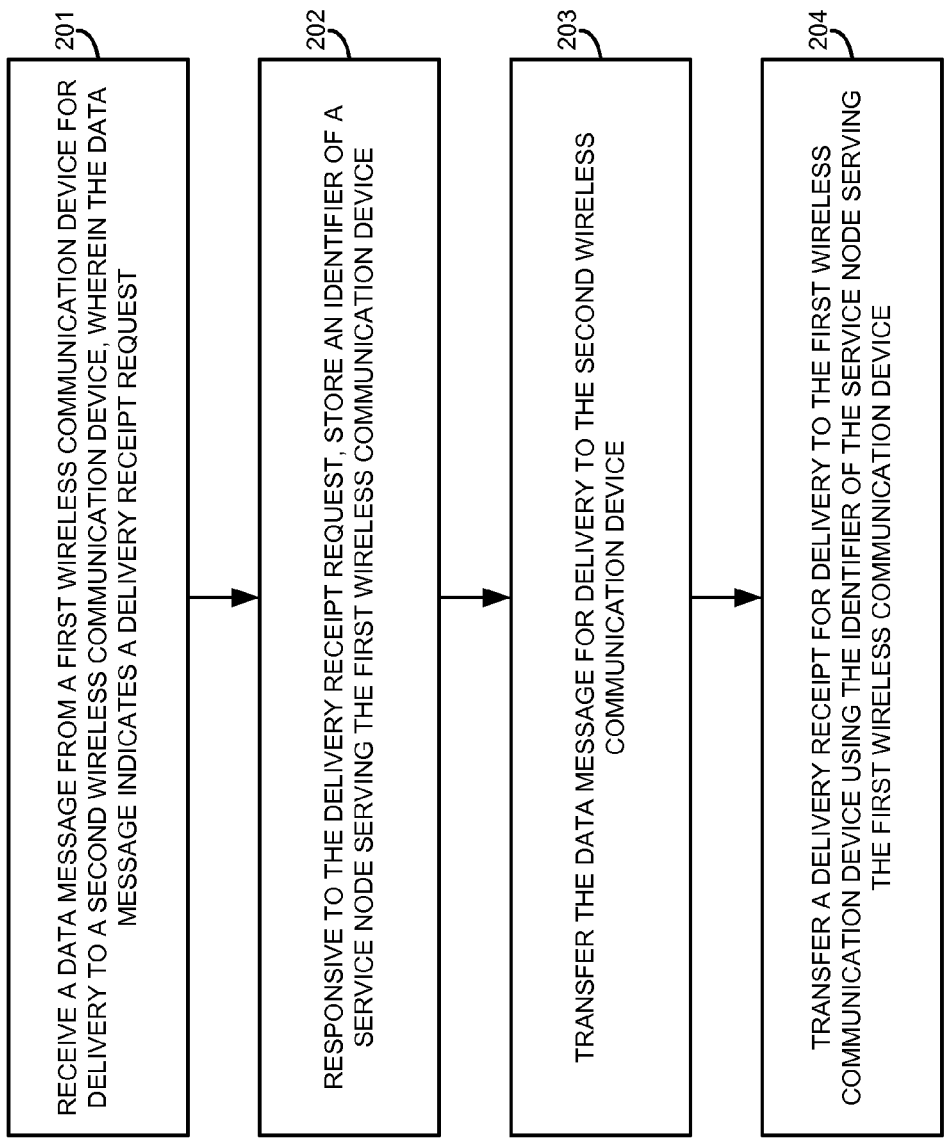
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed to facilitate message delivery receipt transmission in communication system 100.

To begin, a data message is received from a first wireless communication device 101 for delivery to a second wireless communication device 102, wherein the data message indicates a delivery receipt request (201). Typically, the data message transmitted from wireless communication device 101 is received by data message service system 140 via communication network 130, although other systems or network elements associated with communication network 130 may receive the data message in some examples. The data message could comprise any communication transmitted from the first wireless communication device 101 for delivery to the second wireless communication device 102, such as a short message service (SMS) text message, multimedia messaging service (MMS) message, email message, instant message (IM), peer-to-peer message, or any other message object. The delivery receipt request could be indicated by the data message in several ways, including a delivery receipt flag, a return receipt requested tag, or any other indicator of a request for confirmation that the data message was delivered to the destination wireless communication device 102.

Responsive to the delivery receipt request, data message service system 140 stores an identifier of a service node serving the first wireless communication device 101 (202). The service node could comprise any network element that participates in providing a communication service to wireless communication device 101. For example, the service node serving the first wireless communication device 101 may comprise a mobile switching center (MSC), in which case the identifier of the service node could comprise a point code of the serving MSC. In some examples, data message service system 140 could store the identifier of the service node in a temporary cache or some other memory device from which the identifier of the service node may be retrieved at a later time.

The data message is transferred for delivery to the second wireless communication device (203). The data message is typically transferred by data message service system 140 or some other network element or combination thereof via communication network 130 and delivered to the second wireless communication device 102.

In addition to delivering the data message, a delivery receipt is transferred for delivery to the first wireless communication device 101 using the identifier of the service node serving the first wireless communication device 101 (204). Typically, the delivery receipt provides a notification that the data message was delivered successfully to the second wireless communication device 102, although the delivery receipt could also indicate an unsuccessful delivery attempt in some examples. For example, the delivery receipt may be transferred for delivery to the first wireless communication device 101 if delivery of the data message to the second wireless communication device 102 was either successful or unsuccessful. In order to transfer the delivery receipt to the first wireless communication device 101, data message service system 140 utilizes the identifier of the service node serving the first wireless communication device 101 that was cached upon receipt of the data message from the first wireless communication device 101. In some examples, data message service system 140 may retrieve the identifier of the service node from the cache and transfer the delivery receipt for delivery to the first wireless communication device 101 based on the service node identified.

Advantageously, an identifier of a service node serving the first wireless communication device 101 is cached upon receipt of a data message that requests delivery receipt. After delivering the data message to the destination device 102, the identifier of the service node serving the first wireless communication device 101 can be retrieved from the cache which may be used to transfer a delivery receipt to device 101. In this manner, the transfer of the delivery receipt to the first wireless communication device 101 is expedited using the cached identifier of the service node serving the first wireless communication device 101, thereby avoiding unnecessary requests to rediscover the identifier of the service node in order to transfer the delivery receipt to device 101.

Referring back to FIG. 1, wireless communication devices 101 and 102 individually comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication devices 101 and 102 may also include a user interface, memory system, software, processing circuitry, or some other communication components. For example, wireless communication devices 101 and 102 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication devices 101 and 102 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication devices 101 and 102 and their respective wireless access nodes 110 and 120.

Wireless access nodes 110 and 120 individually comprise RF communication circuitry and an antenna. The RF communication circuitry typically includes an amplifier, filter, RF modulator, and signal processing circuitry. Wireless access nodes 110 and 120 may also comprise a router, server, memory device, software, processing circuitry, cabling, power supply, network communication interface, structural support, or some other communication apparatus. Wireless access nodes 110 and 120 could comprise a base station, Internet access node, telephony service node, wireless data access point, or some other wireless communication system—including combinations thereof. Some examples of wireless access nodes 110 and 120 include a base transceiver station (BTS), base station controller (BSC), radio base station (RBS), Node B, enhanced Node B (eNodeB), and others—including combinations thereof. Wireless network protocols that may be utilized by wireless access nodes 110 and 120 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Data message service system 140 comprises a processing system and communication transceiver. Data message service system 140 may also include other components such as a router, server, data storage system, and power supply. Data message service system 140 may reside in a single device or may be distributed across multiple devices. Data message service system 140 may be a discrete system or may be integrated within other systems—including other systems within communication system 100. In some examples, data message service system 140 could comprise a short message service center (SMSC), home agent, packet data serving node (PDSN), network switch, mobile switching center, router, switching system, packet gateway, network gateway system, Internet access node, application server, service node, firewall, or some other communication system—including combinations thereof.

Wireless communication links 111 and 112 use the air or space as the transport medium. Wireless communication links 111 and 112 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111 and 112 may comprise many different signals sharing the same link. For example, wireless communication links 111 and 112 could each include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport medium—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may each be direct links or could include intermediate networks, systems, or devices.

Figure 3:
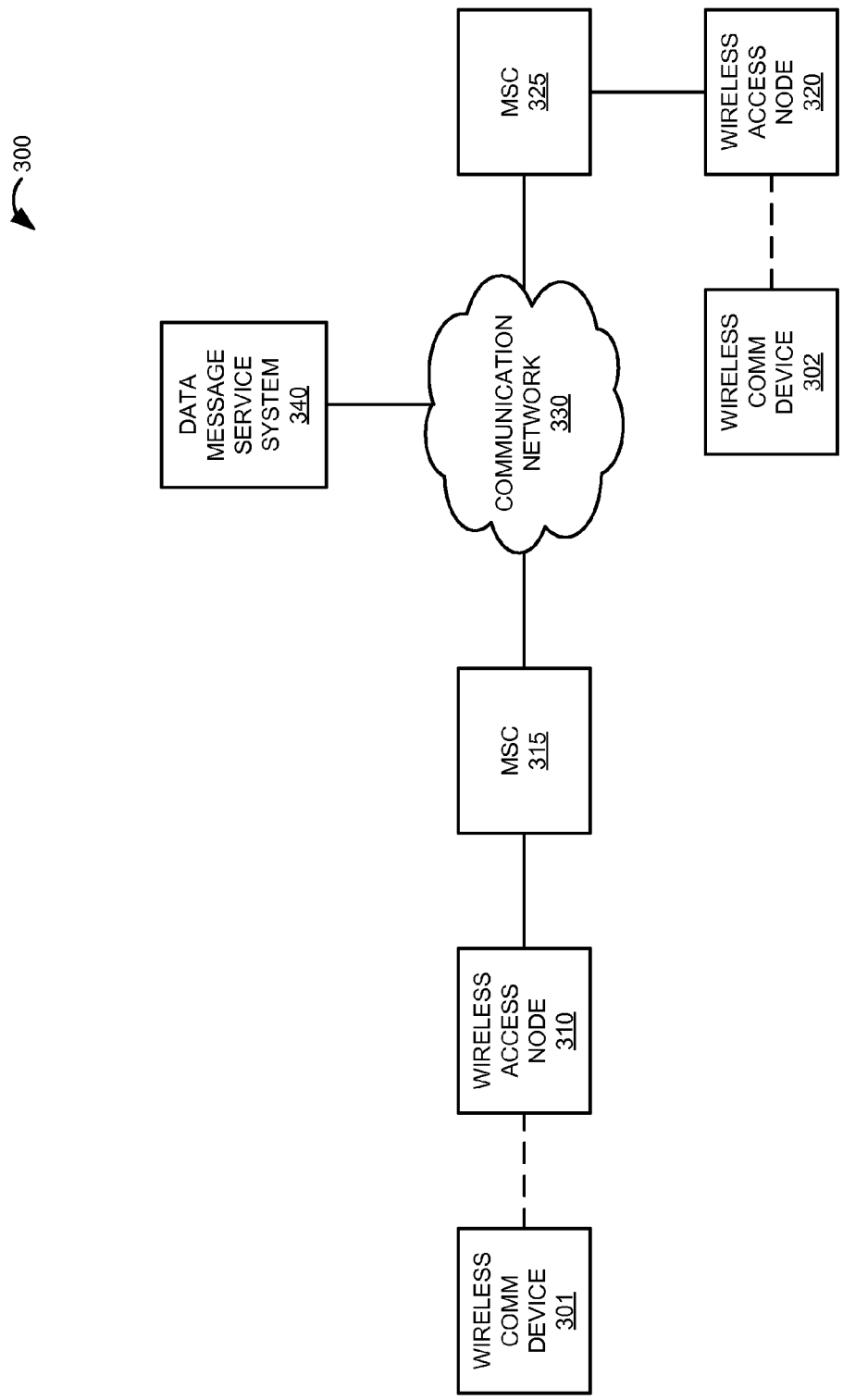
FIG. 3 is a block diagram that illustrates a communication system in an exemplary embodiment.

FIG. 3 is a block diagram that illustrates communication system 300 in an exemplary embodiment. Communication system 300 includes wireless communication devices 301 and 302, wireless access nodes 310 and 320, mobile switching center (MSC) 315, MSC 325, communication network 330, and data message service system 340. In this example, data message service system 340 comprises a short message service center (SMSC) that stores, forwards, converts, and delivers SMS messages. In this embodiment, data message service system 340 is also configured to transfer a delivery receipt upon request to notify a sending wireless communication device when an SMS message is received by its intended recipient. Exemplary techniques that may be used to provide a delivery receipt to a wireless communication device that sends an SMS message will now be described with respect to FIG. 4.

Figure 4:
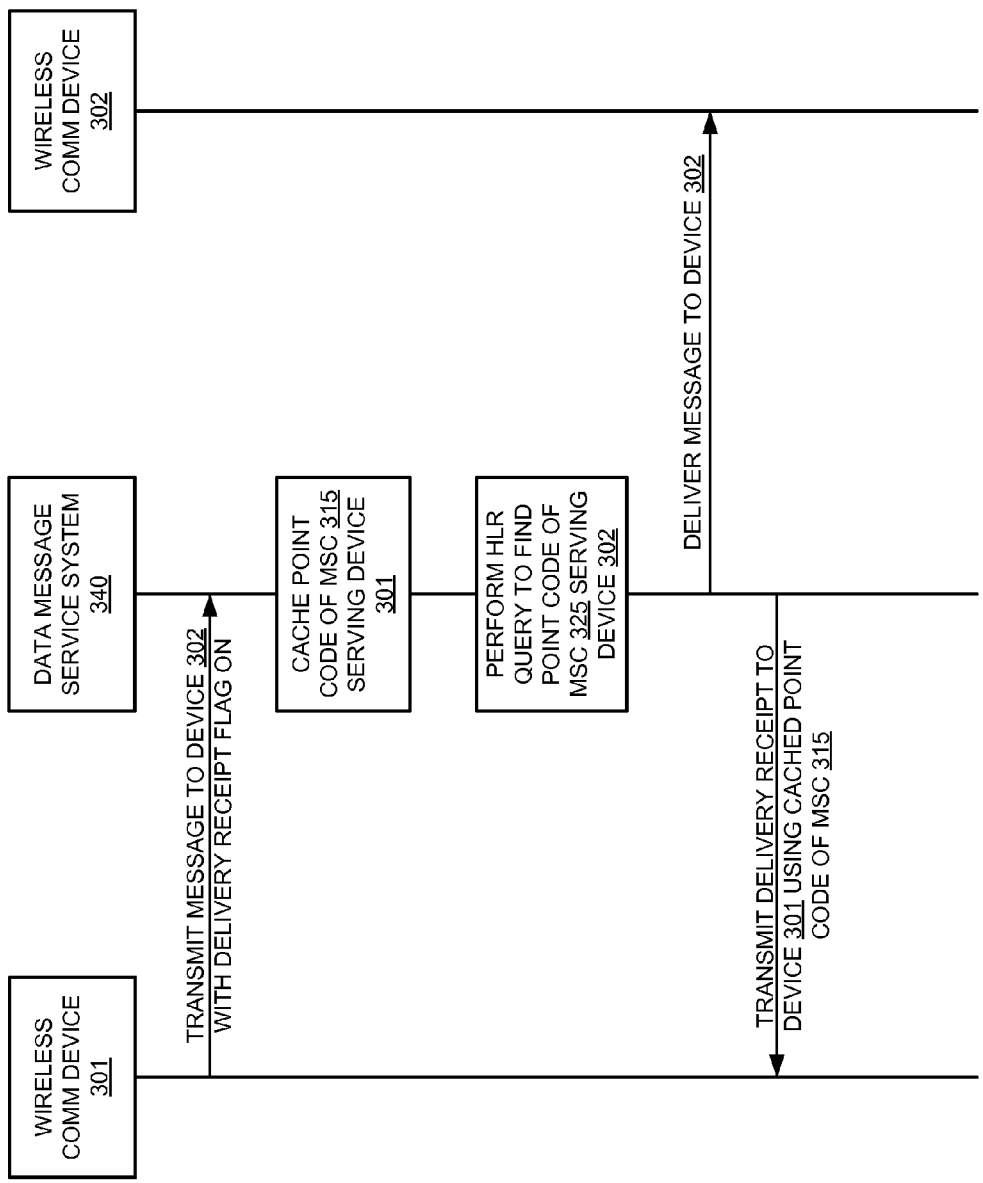
FIG. 4 is a sequence diagram that illustrates an operation of a communication system in an exemplary embodiment.

FIG. 4 is a sequence diagram that illustrates an operation of communication system 300 in an exemplary embodiment. To begin, wireless communication device 301 transmits an MSM message addressed to wireless communication device 302 with the delivery receipt flag set to "ON". Data message service system 340 receives the SMS message transmitted from wireless communication device 301 along with the point code of MSC 315 serving device 301. In response to the delivery receipt flag being set to "ON", data message service system 340 caches the point code of MSC 315 that is serving wireless communication device 301 for use later when sending the delivery receipt.

After caching the point code of MSC 315, data message service system 340 performs a home location register (HLR) query to the HLR associated with the destination wireless communication device 302 to find the point code of MSC 325 serving device 302. Data message service system 340 receives the point code of MSC 325 and uses this information to deliver the SMS message to wireless communication device 302.

After delivering the SMS message to wireless communication device 302, data message service system 340 creates a new delivery receipt message to notify wireless communication device 301 that the SMS message has been delivered to wireless communication device 302. Data message service system 340 checks the cache and retrieves the point code of MSC 315 serving wireless communication device 301. Data message service system 340 then transmits the delivery receipt message to the sending wireless communication device 301 using the cached point code of MSC 315.

In the above manner, the provision of the delivery receipt message to wireless communication device 301 upon successful delivery of the SMS message to the destination wireless communication device 302 is facilitated. Because data message service system 340 caches the point code of MSC 315 serving the sending wireless communication device 301 when the delivery receipt flag is set to "ON", it is unnecessary for data message service system 340 to perform an additional HLR query to rediscover the point code of MSC 315. The benefits of caching the point code of the serving MSC 315 include a reduction in HLR requests in the network, a reduction of network traffic and congestion, and faster delivery times for delivery receipt messages.

Figure 5:
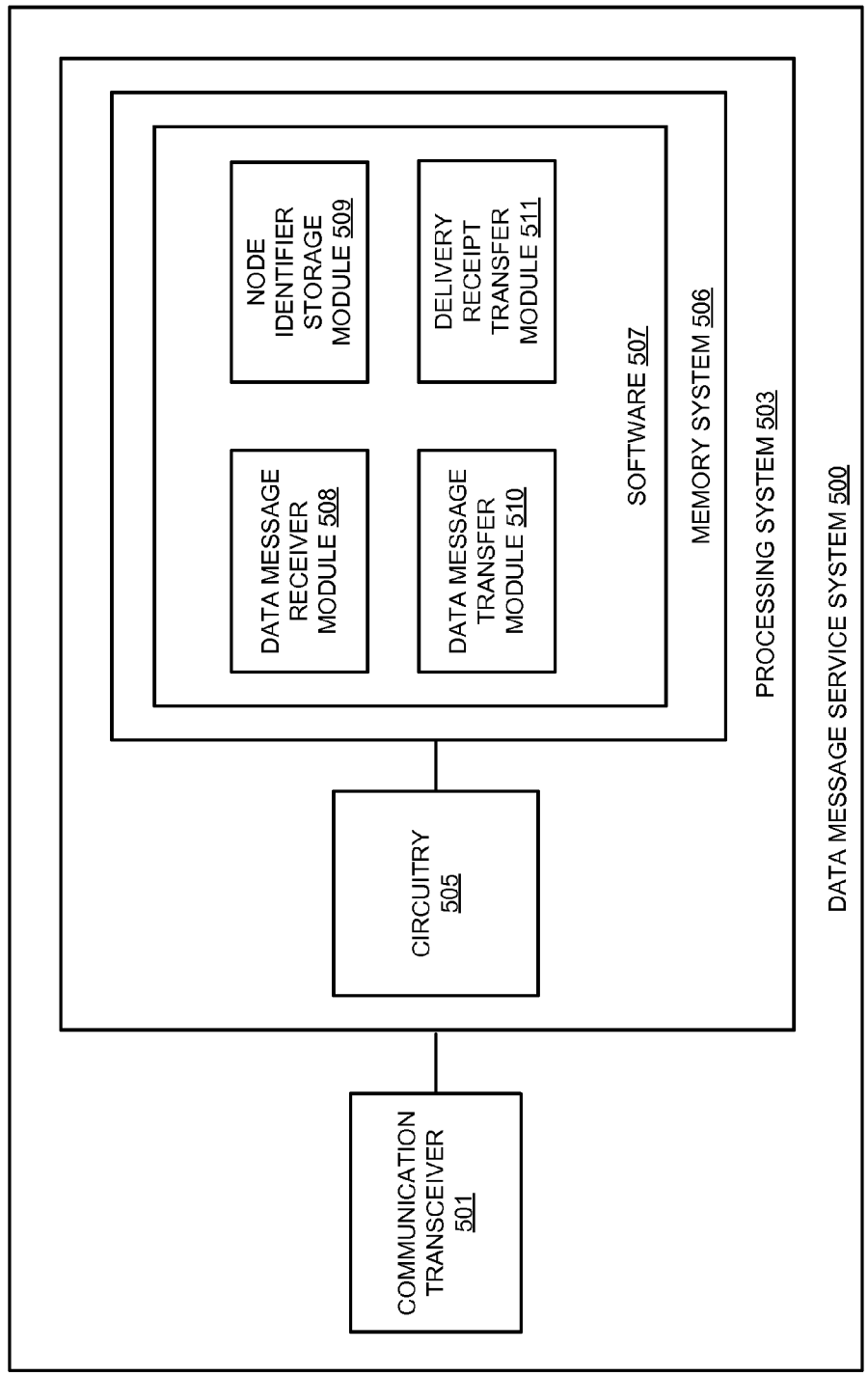
FIG. 5 is a block diagram that illustrates a data message service system.

FIG. 5 is a block diagram that illustrates data message service system 500. Data message service system 500 provides an example of data message service systems 140 and 340, although systems 140 and 340 may have alternative configurations. Data message service system 500 comprises communication transceiver 501 and processing system 503. Processing system 503 is linked to communication transceiver 501. Processing system 503 includes processing circuitry 505 and memory system 506 that stores operating software 507. Operating software 507 comprises software modules 508-511.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof. Communication transceiver 501 may be configured to receive a data message from a first wireless communication device for delivery to a second wireless communication device, wherein the data message indicates a delivery receipt request. Communication transceiver 501 may be further configured to transfer the data message for delivery to the second wireless communication device, and transfer a delivery receipt for delivery to the first wireless communication device using an identifier of a service node serving the first wireless communication device.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-511, although software 507 could have alternative configurations in other examples.

When executed by circuitry 505, operating software 507 directs processing system 503 to operate as described herein for data message service system 140. In particular, operating software 507 may direct processing system 503 to direct communication transceiver 501 to receive a data message from a first wireless communication device for delivery to a second wireless communication device, wherein the data message indicates a delivery receipt request. Operating software 507 further directs processing system 503 to, responsive to the delivery receipt request, store an identifier of a service node serving the first wireless communication device. In addition, operating software 507 directs processing system 503 to direct communication transceiver 501 to transfer the data message for delivery to the second wireless communication device. Finally, operating software 507 directs processing system 503 to direct communication transceiver 501 to transfer a delivery receipt for delivery to the first wireless communication device using the identifier of the service node serving the first wireless communication device.

In this example, operating software 507 comprises a data message receiver software module 508 that receives a data message from a first wireless communication device for delivery to a second wireless communication device, wherein the data message indicates a delivery receipt request. In addition, operating software 507 comprises a node identifier storage software module 509 that stores an identifier of a service node serving the first wireless communication device responsive to the delivery receipt request. Operating software 507 also comprises a data message transfer software module 510 that transfers the data message for delivery to the second wireless communication device. Finally, operating software 507 comprises a delivery receipt transfer software module 511 that transfers a delivery receipt for delivery to the first wireless communication device using the identifier of the service node serving the first wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data message service system to facilitate message delivery receipt transmission in a communication system, the method comprising:
   receiving a data message from a first wireless communication device for delivery to a second wireless communication device, wherein the data message indicates a delivery receipt request;
   responsive to the delivery receipt request, storing an identifier of a mobile switching center (MSC) serving the first wireless communication device for subsequent use to transfer a delivery receipt for delivery to the first wireless communication device;
   transferring the data message for delivery to the second wireless communication device;
   receiving the delivery receipt for delivery to the first wireless communication device; and
   in response to receiving the delivery receipt, transferring the delivery receipt for delivery to the first wireless communication device using the stored identifier of the MSC serving the first wireless communication device.

2. The method of claim 1 wherein the MSC serving the first wireless communication device is coupled to a Long Term Evolution (LTE) core network.

3. The method of claim 1 wherein transferring the delivery receipt for delivery to the first wireless communication device comprises transferring the delivery receipt for delivery to the first wireless communication device if delivery of the data message to the second wireless communication device was successful.

4. The method of claim 1 wherein transferring the delivery receipt for delivery to the first wireless communication device comprises transferring the delivery receipt for delivery to the first wireless communication device if delivery of the data message to the second wireless communication device was unsuccessful.

5. The method of claim 1 wherein storing the identifier of the MSC serving the first wireless communication device comprises storing the identifier of the SMS center in a cache.

6. The method of claim 5 wherein transferring the delivery receipt for delivery to the first wireless communication device using the identifier of the MSC serving the first wireless communication device comprises retrieving the identifier of the MSC from the cache and transferring the delivery receipt for delivery to the first wireless communication device using the identifier of the MSC.

7. The method of claim 1 wherein transferring the delivery receipt for delivery to the first wireless communication device using the identifier of the MSC serving the first wireless communication device comprises retrieving the identifier of the MSC over an LTE core network and transferring the delivery receipt for delivery to the first wireless communication device over an LTE core network.

8. A data message service system comprising:
   a communication transceiver configured to receive a data message from a first wireless communication device for delivery to a second wireless communication device, wherein the data message indicates a delivery receipt request; and a processing system configured to, responsive to the delivery receipt request, store an identifier of a mobile switching center (MSC) serving the first wireless communication device for subsequent use to transfer a delivery receipt for delivery to the first wireless communication device;

the processing system configured to direct the communication transceiver to transfer the data message for delivery to the second wireless communication device, receive the delivery receipt for delivery to the first wireless communication device, and responsively transfer the delivery receipt for delivery to the first wireless communication device using the stored identifier of the MSC serving the first wireless communication device.

9. The system of claim 8 wherein the MSC serving the first wireless communication device is coupled to a Long Term Evolution (LTE) core network.

10. The system of claim 8 wherein the processing system configured to direct the communication transceiver to transfer the delivery receipt for delivery to the first wireless communication device comprises the processing system configured to direct the communication transceiver to transfer the delivery receipt for delivery to the first wireless communication device if delivery of the data message to the second wireless communication device was successful.

11. The system of claim 8 wherein the processing system configured to direct the communication transceiver to transfer the delivery receipt for delivery to the first wireless communication device comprises the processing system configured to direct the communication transceiver to transfer the delivery receipt for delivery to the first wireless communication device if delivery of the data message to the second wireless communication device was unsuccessful.

12. The system of claim 8 wherein the processing system configured to store the identifier of the MSC serving the first wireless communication device comprises the processing system configured to store the identifier of the MSC in a cache.

13. The system of claim 12 wherein the processing system configured to direct the communication transceiver to transfer the delivery receipt for delivery to the first wireless communication device using the identifier of the MSC serving the first wireless communication device comprises the processing system configured to retrieve the identifier of the MSC from the cache and direct the communication transceiver to transfer the delivery receipt for delivery to the first wireless communication device using the identifier of the MSC.

14. The system of claim 8 wherein the processing system configured to direct the communication transceiver to transfer the delivery receipt for delivery to the first wireless communication device using the identifier of the MSC serving the first wireless communication device comprises the processing system configured to retrieve the identifier of the MSC over an LTE core network and direct the communication transceiver to transfer the delivery receipt for delivery to the first wireless communication device over an LTE core network.

15. A computer apparatus in a data message service system to facilitate message delivery receipt transmission in a communication system, the apparatus comprising:

at least one non-transitory computer-readable storage medium storing software instructions; and software instructions configured, when executed by the data message service system, to direct the data message service system to receive a data message from a first wireless communication device for delivery to a second wireless communication device, wherein the data message indicates a delivery receipt request, responsive to the delivery receipt request, store an identifier of a mobile switching center (MSC) serving the first wireless communication device for subsequent use to transfer a delivery receipt for delivery to the first wireless communication device, transfer the data message for delivery to the second wireless communication device, receive the delivery receipt for delivery to the first wireless communication device, and in response to receiving the delivery receipt, transfer the delivery receipt for delivery to the first wireless communication device using the stored identifier of the MSC serving the first wireless communication device.

16. The apparatus of claim 15 wherein the MSC serving the first wireless communication device is coupled to a Long Term Evolution (LTE) core network.

17. The apparatus of claim 15 wherein the software instructions configured to direct the data message service system to transfer the delivery receipt for delivery to the first wireless communication device comprises the software instructions configured to direct the data message service system to transfer the delivery receipt for delivery to the first wireless communication device if delivery of the data message to the second wireless communication device was successful.

18. The apparatus of claim 15 wherein the software instructions configured to direct the data message service system to transfer the delivery receipt for delivery to the first wireless communication device comprises the software instructions configured to direct the data message service system to transfer the delivery receipt for delivery to the first wireless communication device if delivery of the data message to the second wireless communication device was unsuccessful.

19. The apparatus of claim 15 wherein the software instructions configured to direct the data message service system to store the identifier of the MSC serving the first wireless communication device comprises the software instructions configured to direct the data message service system to store the identifier of the MSC in a cache.

20. The apparatus of claim 19 wherein the software instructions configured to direct the data message service system to transfer the delivery receipt for delivery to the first wireless communication device using the identifier of the MSC serving the first wireless communication device comprises the software instructions configured to direct the data message service system to retrieve the identifier of the MSC from the cache and transfer the delivery receipt for delivery to the first wireless communication device using the identifier of the MSC.

* * * * *